United States Patent [19]
Pettelkau et al.

[11] 4,163,091
[45] Jul. 31, 1979

[54] PROCESS FOR THE POLYMERIZATION OF CHLOROPRENE

[75] Inventors: Hans-Jürgen Pettelkau, Burscheid; Gerhard Hohmann, Leverkusen, both of Fed. Rep. of Germany

[73] Assignee: Bayer Aktiengesellschaft, Fed. Rep. of Germany

[21] Appl. No.: 806,360

[22] Filed: Jun. 14, 1977

[30] Foreign Application Priority Data

Jun. 18, 1976 [DE] Fed. Rep. of Germany ....... 2627452

[51] Int. Cl.² ........................... C08F 2/00; C08F 4/30; C08F 36/18
[52] U.S. Cl. .................................... 526/208; 252/428; 252/430; 526/86; 526/220; 526/295
[58] Field of Search ........................ 526/208, 220, 86; 252/428, 430

[56] References Cited

U.S. PATENT DOCUMENTS

| 2,417,034 | 3/1947 | Youker | 428/428 |
| 2,426,854 | 9/1947 | Bare | 526/208 |
| 3,013,000 | 12/1961 | Heinz et al. | 526/220 |
| 3,058,937 | 10/1962 | Furness | 526/208 |
| 3,344,128 | 9/1967 | Vraneck | 526/220 |

FOREIGN PATENT DOCUMENTS 1124693 3/1962 Fed. Rep. of Germany ........... 526/220

Primary Examiner—Herbert J. Lilling
Attorney, Agent, or Firm—Connolly and Hutz

[57] ABSTRACT

The polymerization of chloroprene in the presence of an inorganic peroxy compound, anthraquinone-2-sulphonic acid-alkali salt and formamidine sulphinic acid.

5 Claims, No Drawings

PROCESS FOR THE POLYMERIZATION OF CHLOROPRENE

This invention relates to a process for the polymerisation of chloroprene in aqueous emulsion in the presence of known surface-active compounds and optionally in the presence of comonomers in the alkaline, neutral or acid pH-range, a combination of an inorganic peroxy compound, anthraquinone-2-sulphonic acid-alkali salt and formamidine sulphinic acid being used as an activator system.

The polymerisation of chloroprene has long been known and has frequently been described in the literature, cf. for example Encyclopedia of Polymer Science and Technology, Vol. 3, pages 705–730, U.S. Pat. Nos. 2,394,291 and 2,567,117; British Pat. Nos. 512,458, 1,048,235 and 1,094,321; and German Offenlegungsschrifts Nos. 2,008,674, 2,047,450 and 2,241,394.

The latex obtained in the polymerisation stage can be worked up into rubber by low-temperature or by electrolyte coagulation. These processes are described, for example, in Chem. Engng. Progr. 43, 391 (1947), and in German Pat. Nos. 1,051,506 and 1,111,804.

The latices may also be directly processed as described, for example, in the journal "Gummi, Asbest, Kunststoffe" 1973, Nos. 5–7, pp. 394–398, 494–503 and 574–582 and in the book entitled "Neoprene Latex" by John C. Carl, of E. J. Du Pont de Nemours & Co. (Inc.), Wilmington, Delaware (USA).

The polymerisation temperature largely determines the service properties of the polymer:

A product produced at relatively low temperature has a marked tendency towards crystallisation and is eminently suitable for the production of adhesives.

Polymer produced at elevated temperature can be used for the production of rubber products with valuable properties (for example conveyor belts, mine and deep-sea cables, bridge bearings, etc.).

In the polymerisation of chloroprene, the starting monomers used are normally stabilised against spontaneous polymerisation because chloroprene shows a marked affinity for polymerisation (cf. Houben-Weyl, Methoden der organischen Chemie, Vol. XIV/1. Makromolekulare Stoffe, part 1, Georg Thieme Verlag Stuttgart, 1961, pages 733 et seq) and because the exothermic reaction runs out of control very easily, particularly in the case of large batches. The stabilizers used include, for example, phenothiazine, p-tert.-butyl pyrocatechol and nitrogen monoxide.

German Auslegeschrift No. 1,097,689 describes an advantageous polymerisation process for chloroprene stabilized with phenothiazine for example against uncontrolled and premature polymerisation. There is no need for the stabiliser to be separated off before polymerisation, which eliminates the need for, and danger involved in, storing the unstabilised chloroprene in supercooled form in the strict absence of oxygen. In addition, polymers with favourable properties are obtained by polymerisation from stabilised chloroprene. The advantage of carrying out polymerisation in the presence of stabilisers is obtained by using formamidine sulphinic acid in quantities of from 0.1 to 0.4% by weight, based on the amount of monomer used.

Stabilised chloroprene can also be polymerised with 0.1% by weight (based on monomer) of azo fatty acid dinitriles, as described in U.S. Pat. No. 2,707,180. The azo compounds release starter radicals after thermal decomposition so that, under the described reaction conditions, elevated temperatures are required for obtaining an adequate reaction velocity. Hardly any polymer is obtained with peroxy disulphates instead of the azo fatty acid dinitriles.

When the polymerisation of chloroprene is activated with peroxy disulphates, irregular polymerisation velocities are observed. According to U.S. Pat. No. 2,426,854, these difficulties can be eliminated by adding small quantities of anthraquinone-2-sulphonic acid (in the form of its alkali salt).

The decomposition of the inorganic peroxy compounds (for example the peroxy disulphates) is greatly dependent upon temperature under constant reaction conditions. In order to obtain an adequate reaction velocity even at relatively low temperatures, U.S. Pat. No. 2,417,034 proposes the addition of reducing compounds, for example potassium ferricyanide in the strict absence of oxygen. The polymerisation reaction may even be carried out at relatively low temperatures with amines as the decomposition catalyst (cf. Dispersionen synthetischer Hochpolymerer (Dispersions of Synthetic High Polymers), Part I, by Friedrich Holscher, Springer Verlag Berlin-Heidelberg, New York, 1963).

It is well known among experts that, where a reaction is initiated with peroxy disulphate, the amount of activator has to be kept as small as possible and the radical-forming process has to take place as uniformly as possible in order to obtain products of high quality. The number of polymerisation initiatiors and hence the number of polymer chains increases with increasing addition of persulphate.

In addition, the radical-forming reaction has to continue throughout the entire polymerisation time.

Furthermore, it is known that a low consumption of activator contributes considerably towards reducing or avoiding coagulate formation during the polymerisation reaction. By using an activator system consisting of an inorganic peroxy compound, anthraquinone-2-sulphonic acid-alkali salt, preferably sodium salt, and formamidine sulphinic acid, it was surprisingly possible to achieve the required objective namely reducing the amount of activator, avoiding deposits, obtaining a more uniform polymer structure and, hence, a favourable range of service properties.

The invention, therefore, provides a process for the polymerisation of chloroprene which may contain up to 50% by weight of a comonomer in an aqueous emulsion in the presence of known surface-active compounds in the alkaline, neutral or acid pH-range, wherein the three-component combination of an inorganic peroxy compound, anthraquinone-2-sulphonic acid-alkali salt and formamidine sulphinic acid is used as an activator system.

Also, the invention provides an activator/initiator combination for the polymerisation of chloroprene consisting of 95 to 50% by weight of formamidine sulphinic acid, 4.5 to 25% by weight of an inorganic peroxy compound and 0.5 to 2.5% by weight of the alkali salt of anthraquinone-2-sulphonic acid, wherein the quantitative ratio of the peroxy compound to the alkali salt is in the range of from 2:1 to 10:1.

For example, it is possible to considerably improve the viscosity stability of the polychloroprene latex, a property which is of particular advantage in cases where the latex is used as an adhesive. In the radical emulsion polymerisation of chloroprene at low temperatures, there is the further advantage that, where the process is carried out continuously the polymerisation temperature of, for example, 10° C. can be lowered by a few degrees centrigrade without reducing the polymerisation velocity. As known to the expert, a reduction by a few degrees in the polymerisation temperature in this range produces a distinct increase in crystallisation.

The activator combination according to the invention may be used with advantage both for the batch polymerisation and also for the continuous polymerisation of chloroprene, its advantages being particularly apparent in continuous working. The combination of an inorganic peroxy compound, anthraquinone-2-sulphonic acid-alkali salt and formamidine sulphinic acid shows the most marked advantages over conventional activator systems in the alkaline-pH-range. Since the decomposition of inorganic peroxy compounds is distinctly dependent upon the pH-value of the emulsion with all other parameters kept constant, the effect of using the activator combination according to the invention is not as pronounced in the neutral and acid range as in the alkaline range.

The three-component combination of inorganic peroxy compound preferably alkali salt, alkali salt of anthraquinone-2-sulphonic acid and formamidine sulphinic acid is advantageously used in quantities of from 0.02 to 0.6% by weight and more especially in quantities of from 0.04 to 0.2% by weight, based on the monomers used. The three-component combination itself preferably consists of from 95 to 50% by weight of formamidine sulphinic acid, from 4.5 to 25% by weight of inorganic peroxy compound and from 0.5 to 25% of the alkali salt of anthraquinone-2-sulphonic acid, the quantitative ratio of peroxy compound to the alkali salt being with particular preference in the range of from 2:1 to 10:1.

By CO-activation with formamidine sulphinic acid, it is possible to control the decomposition of the inorganic peroxy compound, the anthraquinone-2-sulphinic acid present suppressing induction periods of the peroxy compound. In this way, a uniform radical stream is obtained in the emulsion during the polymerisation reaction and the consumption of activator is kept low.

The polymerisation reaction is carried out in known manner as an emulsion polymerisation reaction.

Suitable inorganic peroxy compounds are the known compounds such as, for example, peroxy sulphates and disulphates, peroxy phosphates, peroxy borates and hydrogen peroxide, peroxy disulphates being preferred by virtue of their availability.

Suitable emulsifiers are the known anionic, cationic, non-ionic and amphoteric surface-active compounds.

The following are mentioned as examples of suitable emulsifiers:

(a) anionic emulsifiers:
   alkali metal salts of disproportionated abietic acid of which the production is described in U.S. Pat. Nos. 2,201,237 and 2,154,629; alkali metal salts of saturated and/or unsaturated $C_6$–$C_{25}$-fatty acids; alkali metal salts of alkylated or non-alkylated naphthalene sulphonic acids which have been condensed with formaldehyde and of which the production is described by R. S. Barrows and G. W. Scott in Ind. eng. Chem. 40, 2193 (1948); alkyl benzene sulphates, alkyl benzene sulphonates, alkenol polyoxethylate sulphates, alcohol isoethionate, sulphosuccinic acid esters, alkali metal salts of the sulphates of aliphatically alkylated phenols or naphthols.

(b) cationic emulsifiers:
   quaternary ammonium halides and quaternary carboxymethylated ammonium halides.

(c) non-ionic emulsifiers:
   ethylene or propylene adducts of fatty alcohols, fatty acids, fatty acid amides, alkylated or non-alkylated phenols.

(d) amphoteric emulsifiers:

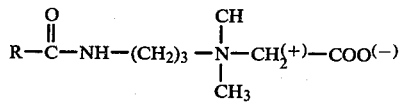

$R$ = a saturated or unsaturated, linear or branched $C_8$–$C_{18}$-alkyl radical.

The emulsifiers are used, either individually or in combination, in quantities sufficient to guarantee a surface-active effect. Depending upon the type of compound used, the combinations selected for the surfaceactive substances and the pH-range, the quantities of emulsifier used may vary between 2 and 6% by weight, based on the quantity of monomers used.

The polymerisation reaction may be carried out at temperatures in the range of from 0° to 70° C. and is preferably carried out at temperatures in the range of from 5° to 55° C.

It is advisable to add the inorganic peroxy compound to the alkali salt of anthraquinone-2-sulphonic acid in the aqueous phase before the beginning of polymerisation and then to start the polymerisation reaction with the formamidine sulphinic acid. In this way, the course of the polymerisation reaction can also be effectively controlled by measured addition.

Depending upon the application envisaged for the polymer, the monomer is converted to a level of from 50 to 99%, conversions of from 65 to 70% being suitable for rubbers for obtaining advantageous service properties, whilst latices of the type required for strengthening paper or for refining bitumen are produced with a high conversion (up to 99%).

For carrying out the process, chloroprene may be polymerised on its own or may be replaced by up to 50% by weight of another compound copolymerisable with chloroprene, for example acrylonitrile, methacrylonitrile, α-chloroacrylonitrile, acrylic acid esters, methacrylic acid esters, vinylidene chloride, styrene, vinyl toluenes, 1,3-butadiene, 1-chloro-1,3-butadiene, 2,3-dichloro-1,3-butadiene or 2-chloro-3-methyl-1,3-butadiene.

By adding known modifying compounds, for example mercaptans, xanthogene disulphides, quinones, benzyl iodide or iodoform, it is possible to vary the structure and properties of the polymers within wide limits.

Unreacted organic compounds may be removed by steam distillation, for example at 50° C. and under an absolute pressure of 20 Torr.

The following Examples are intended to illustrate the invention without limiting it in any way.

EXAMPLE I

Polymerisation according to the prior art

To produce the polymer, a mixture of the following composition was polymerised under nitrogen:

| | | |
|---|---|---|
| Chloroprene | 100.00 | parts by weight |
| n-Dodecyl mercaptan | 0.25 | parts by weight |
| Phenothiazine | 0.01 | part by weight |
| Desalted water | 120.00 | parts by weight |
| Sodium salt of a disproportionated abietic acid | 4.00 | parts by weight |
| Caustic soda | 0.6 | part by weight |
| Sodium salt of the condensation product of napthalene sulphonic acid and formaldehyde | 0.6 | part by weight |

The polymerisation reaction was carried out at 40° C. by running a 1% aqueous solution of formamidine sulphinic acid continuously into the mixture.

The reaction was stopped at a monomer conversion of 65% by removing the monomer.

The consumption of activator amounted to 0.21% by weight, based on the quantity of monomer used.

EXAMPLE 2

Polymerisation according to prior art

The procedure was as described in Example 1, except that the formamidine sulphinic acid was replaced by a 2% aqueous solution of potassium peroxy disulphate containing 10% by weight of the sodium salt of anthraquinone-2-sulphonic acid, the quantity by weight being based on $K_2S_2O_8$.

0.17% by weight of $K_2S_2O_8$ had been consumed by the time a monomer conversion of 65% was reached.

EXAMPLE 3

Polymerisation with the activator system according to the invention

The procedure was as described in Example 1, except that 0.05% by weight of $K_2S_2O_8$ and 0.05% by weight of anthraquinone-2-sulphonic acid (sodium salt) were added to the mixture. The polymerisation reaction commenced immediately after the beginning of the dropwise addition of the 1% aqueous formamidine sulphinic acid solution.

0.04% by weight of formamidine sulphinic acid had been consumed by the time the monomer conversion reached 65%. (All quantities are based on the quantity of monomer used).

EXAMPLE 4

A mixture of the following composition was polymerised under nitrogen:

| | | |
|---|---|---|
| Chloroprene | 100.0 | parts by weight |
| Phenothiazone | 0.005 | part by weight |
| n-Dodecyl mercaptan | 0.10 | part by weight |
| Desalted water | 60.0 | parts by weight |
| Sodium salt of a disproportionated abietic acid | 2.8 | parts by weight |
| Caustic soda | 0.5 | part by weight |
| Adduct of i-nonyl phenol and 10 moles of ethylene amide | 0.5 | part by weight |

Polymerisation was carried out at 50° C. by running a 2.5% aqueous formamidine sulphinic acid continuously into the mixture.

The monomer was converted to a level of 99%. The consumption of activator amounted to 0.32% by weight, based on monomer.

EXAMPLE 5

The procedure was as described in Example 4, except that 0.05% by weight of $K_2S_2O_8$ and 0.0005% by weight of anthraquinone-2-sulphonic acid (sodium salt) were added to the mixture before the beginning of the polymerisation reaction.

0.08% by weight of formamidine sulphinic acid was required to obtain a monomer conversion of 99% (all quantities are based on monomer).

EXAMPLE 6

Polymerisation according to the prior art

To produce the polymer, a mixture of the following composition was polymerised under nitrogen:

| | | |
|---|---|---|
| Chloroprene | 98.0 | parts by weight |
| Methacrylic acid (stabilised with 50 ppm of hydroquinone methyl ether) | 2.0 | parts by weight |
| Phenothiazine | 0.01 | part by weight |
| n-Dodecyl mercaptan | 0.20 | part by weight |
| Desalted water | 85.0 | parts by weight |
| Paraffin sulphonate | 3.5 | parts by weight |
| Adduct of 1 mole of stearyl alcohol and 20 moles of ethylene oxide | 1.0 | part by weight |
| Condensation product of naphthalene sulphonic acid and formaldehyde | 0.3 | part by weight |

The reaction was carried out at a temperature in the range of from 45° to 50° C. After the addition of a 2.5% aqueous formamidine sulphinic acid solution, the polymerisation reaction began vigorously and necessitated intensive cooling. The formamidine sulphinic acid solution was then added dropwise at such a rate that the polymerisation temperature remained in the required range.

0.13% by weight of formamidine sulphinic acid, based on monomer, had been consumed by the time the monomer conversion reached 99%.

On completion of the reaction, the mixture had a pH-value of 4.0.

EXAMPLE 7

The repetition of Example 6 with 0.004% by weight of $K_2S_2O_8$ and 0.0004% by weight of anthraquinone-2-sulphinic acid (sodium salt) produced a reduction in the consumption of formamidine sulphinic acid to 0.04% by weight (all quantities are based on monomer). On completion of the reaction, the mixture had a pH-value of 2.8.

EXAMPLE 8

Continuous polymerisation

The continuous performance of the polymerisation reaction of Example 1 produced the expected reduction in the amounts of activator in relation to the batch-type procedure.

Test Apparatus

From three supply vessels (emulsifier, monomer and activator phase), the phases were pumped by precision metering pumps into a premixing vessel (vol. 1 liter; cooled to 5° C. intensive admixture) and subsequently passed through three polymerisation vessels (heatable and coolable independently of one another).

The polymerisation vessels had a volume of 3 liters. Admixture was obtained by propeller stirrers with a diameter of 5 cm rotating at 600 rpm.

After 15 hours' operation, a state of equilibrium was reached in the continuous polymerisation process. The monomer throughput amounted to 1.5 liters of chloroprene per hour, whilst the monomer conversion as determined at the discharge end of the third vessel amounted to 65%.

The consumptions of activator were determined after 10 hours' equilibrium in the apparatus.

| The activator consumptions amounted to: | for comparison: |
|---|---|
| Continuous procedure Example 8 a) | batch-type procedure Example 17 |
| 0.025% by weight of formamidine sulphinic acid | 0.21% by weight of formamidine sulphinic acid |
| Example 8 b) | Example 2) |
| 0.09% by weight of $K_2S_2O_8$ | 0.17% by weight of $K_2S_2O_8$ |
| 0.009% by weight of anthraquinone-2-sulphonic acid (Na-salt) | 0.017% by weight of anthraquinone-2-sulphonic acid (Na-salt) |
| Example 8 c) | Example 3) |
| 0.05% by weight of $K_2S_2O_8$ | 0.05% by weight of $K_2S_2O_8$ |
| 0.005% by weight of anthraquinone-2-sulphonic acid (Na-salt) | 0.005% by weight of anthraquinone-2-sulphonic acid (Na-salt) |
| 0.0011% by weight of formamidine sulphinic acid | 0.04% by weight of formamidine sulphinic acid |

(All quantities based on monomer).

We claim:
1. An activator/initiator composition for the polymerization of chloroprene containing 95 to 50% by weight of formamidine sulphinic acid, 4.5 to 25% by weight of an inorganic peroxy compound and 0.5 to 25% by weight of an alkali metal salt of anthraquinone-2-sulphonic acid.
2. The activator/initiator composition of claim 1 wherein the quantitative ratio of the peroxy compound to the alkali metal salt is from 2:1 to 10:1.
3. A monomer containing composition comprising chloroprene and up to 50% by weight, based on total monomer, of a monomer which is copolymerizable with chloroprene and from 0.02 to 0.6% by weight, based on total monomer, of the activator/initiator composition of claim 1.
4. A method of polymerizing a monomer composition containing chloroprene and up to 50% by weight, based on total monomer, of a monomer copolymerizable with chloroprene, said method comprising carrying out the polymerization in the presence of an effective amount of the activator/initiator composition of claim 1.
5. The method of claim 4 wherein the alkali metal salt of anthraquinone-2-sulphonic acid and the peroxy compound are added to the monomer composition before the beginning of polymerization and polymerization is initiated and controlled by the addition of said formamidine sulphinic acid.

* * * * *